United States Patent [19]

Kojima

[11] 4,240,323
[45] Dec. 23, 1980

[54] PLASTIC SCREW SOCKET

[75] Inventor: Masaharu Kojima, Toyoda, Japan

[73] Assignee: Nifco Inc., Tokyo, Japan

[21] Appl. No.: 947,372

[22] Filed: Oct. 2, 1978

[30] Foreign Application Priority Data

Oct. 8, 1977 [JP] Japan ................................ 52-134772

[51] Int. Cl.³ ............................................. F16B 13/06
[52] U.S. Cl. ........................................ 85/80; 85/84
[58] Field of Search ................. 85/80, 84, 83, 81, 5 R; 151/41.7 S; 24/73 P, 73 PM, 73 HS

[56] References Cited

U.S. PATENT DOCUMENTS

| 3,383,976 | 5/1968 | Schenkel | 85/83 X |
| 3,413,887 | 12/1968 | Von Wolff et al. | 85/83 |

*Primary Examiner*—Ramon S. Britts
*Attorney, Agent, or Firm*—J. R. Halvorsen; T. W. Buckman

[57] ABSTRACT

Disclosed is the improvement in a plastic screw socket which comprises a flange designed to be brought into contact with one surface of a given panel and a leg extending perpendicularly from the lower surface of the flange and adapted to be inserted through a matched perforation bored in advance in the panel, the flange and the leg being jointly provided therein with a through hole pierced vertically therethrough from the upper surface of the flange to the lower end of the leg, the leg being divided into two opposed segments by two slits inserted longitudinally therein from the lower end of the leg upwardly, whereby the insertion of a screw from above the flange into the through hole causes the leg to bulge outwardly and consequently come into tight engagement with the inner wall of the perforation in the panel. The improvement resides in having the leg divided into two segments by two slits inserted longitudinally therein in such a way that the lateral directions thereof do not coincide with any of the radii drawn from the central line of the through hole.

2 Claims, 3 Drawing Figures

PLASTIC SCREW SOCKET

BACKGROUND OF THE INVENTION

This invention relates to a plastic screw socket of the class used for providing engagement of a setscrew with a metal panel as when another metal panel or some other part is fastened onto the metal panel through the medium of the setscrew.

More particularly this invention relates to an improvement in and concerning a plastic screw socket which comprises a flange designed to be brought into contact with one surface of a given panel and a divided leg extending perpendicularly from the lower surface of the flange and adapted to be inserted through a matched perforation bored in advance in the panel, whereby helical insertion of a setscrew into a through hole axially pierced in the flange and the divided leg throughout their entire heights causes the divided leg to bulge outwardly and, by virtue of this bulging, come into tight engagement with the perforation in the panel so as to enable the setscrew driven into the through hole to be fastened to the panel.

Screw sockets of an operating principle such that helical insertion of a setscrew therein causes their divided legs to be brought into tight engagement with the perforation bored in panels and thereby enables the setscrews to be fastened to the panels through the medium of the sockets are extensively employed as screw receivers for the purpose of attaching parts to cabinets or automobile bodies.

Such a conventional screw socket has its leg divided by two slits inserted longitudinally therein from the lower end of the leg upwardly to the lower surface of the flange opposite each other across the through hole pierced axially therein, whereby the setscrew helically inserted into the aforementioned through hole causes the divided leg to bulge out in perfect symmetry and come into tight engagement with the inner wall of the perforation in the panel.

The conventional screw socket constructed as described above accomplishes its role perfectly by allowing the setscrew to be fastened to the panel. Since the leg, on being diverged by the insertion of the setscrew, bulges out symmetrically as described above, the two slits are opposed to each other across the through hole to divide the leg into two segments. In other words, the leg is divided into the two segments by the two slits which are longitudinally inserted therein from the lower end of the leg upwardly in one vertical plane which includes the axial line of the through hole. Thus, this screw socket has a possibility that the screw, on being helically inserted into the through hole, will accidentally find its way through either of the slits being diverged by the insertion of the screw and, consequently, the tip of the screw will thrust out of the periphery of the leg.

Under normal conditions, the screw which is helically inserted into the through hole advances on the axis of the through hole and causes the leg to bulge outwardly. Since the through hole which runs through the center of the leg opens sideways along the slits formed in the leg and further since the slits in the conventional screw socket are inserted in one common vertical plane that includes the axis of the through hole, there is a possibility that once the screw is accidentally inserted at a slight inclination from the axis under certain work conditions, the posture of the screw can no longer be corrected so as to coincide with the central line of the through hole and, as the result, the tip of the screw will find its way through either of the slits and eventually thrust out of the periphery of the leg.

Particularly in the case of an assembly line in which a multitude of parts are fixed in position by means of setscrews, it is difficult to enable all the setscrews driven into screw sockets of the construction described above to advance correctly on the axes of the through holes of the sockets. Besides, the emergence of the tip of the setscrew through the leg of the screw socket must be avoided because it has a fair possibility of inflicting damage to electric wires distributed within mechanical components under assembly and causing mechanical troubles.

A principal object of this invention is to provide a plastic screw socket which permits a setscrew to be quickly and accurately set in position therein without entailing a possibility of the screw finding its way into either of the slits being diverged by the insertion of the screw or the tip of the screw thrusting out of the periphery of the leg and consequently inflicting damage to the electric wires distributed inside mechanical components and causing mechanical troubles.

SUMMARY OF THE INVENTION

To accomplish the object described above according to the present invention, there is provided a plastic screw socket of which the leg is divided by two slits inserted longitudinally from the lower end of the leg upwardly in such a positional relationship that the lateral directions of the slits do not coincide with any one of the radii drawn from the central line of the through hole pierced along the center of the flange and the leg throughout their entire heights.

The other objects and characteristic features of the present invention will become apparent from the description of a preferred embodiment to be given herein below with reference to the accompanying drawing.

DETAILED DESCRIPTION OF THE INVENTION

Figure 1:
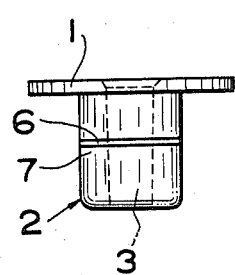
FIG. 1 is a side elevation of one preferred embodiment of the plastic screw socket according to the present invention.

The present invention will be described with reference to the illustrated preferred embodiment thereof. Denoted by 1 is a plate-shaped flange of a suitable thickness, by 2 is a leg perpendicularly extending from the center of the lower surface of the flange, by 3 is a through hole pierced through the center of the flange 1 and the center of the leg 2 from the upper surface of the flange 1 to the lower end of the leg 2 to permit helical insertion of a screw 4 and by 5 are two slits inserted longitudinally from the lower end of the leg 2 upwardly to the lower surface of the flange 1 to divide the leg 2 into two segments.

In the present preferred embodiment, the flange 1 has the shape of a disk and the leg 2 which extends perpendicularly from the lower surface of the flange 1 has the shape of a pillar with a rectangular cross section. The two segments 2a, 2a into which the leg 2 is divided by the two slits 5, 5 are provided substantially at the center of their opposite surfaces with jogs 7, 7 forming steps 6, 6 sidewise. The opposite surfaces of the segments between the jogs and the lower end of the leg are converged downwardly so that the leg 2 has a substantially short diameter at the leading end thereof.

Figure 2:
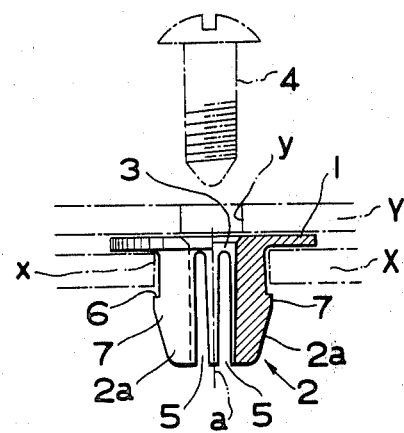
FIG. 2 is a front view of the plastic screw socket of FIG. 1, wherein the right half portion of the socket is cut away to illustrate the interior construction.
Figure 3:
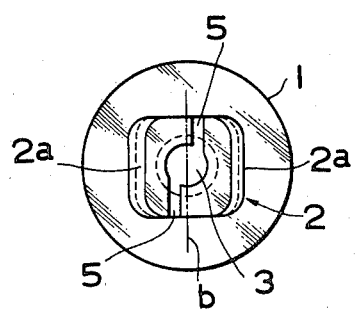
FIG. 3 is a bottom view of the plastic screw socket of FIG. 1.

The two slits 5, 5 are inserted, as illustrated in the drawing, in the longitudinal direction from the lower end of the leg to the upper end thereof, namely, to the lower surface of the flange 1 so as to have the leg 2 divided substantially into two segments. These slits are formed in such a way that their lateral directions do not coincide with any of the radii (not shown) drawn from the central line "a" of the through hole as illustrated in FIG. 2 and FIG. 3. In the present preferred embodiment, the two slits 5, 5 are disposed parallelly to one common vertical plane including one pair of diametrically opposed radii "b" and symmetrically with reference to the aforementioned central line "a". These slits each open at one lateral end on the opposite surfaces of the leg 2 and at the other lateral end on the inner wall of the through hole 3.

The screw socket of the present invention is constructed as described above, and the flange 1 and the leg 2 which is divided into two segments by the two slits are integrally molded with a plastic material similarly to any of the conventional plastic screw sockets.

Now, a description will be made of the actual manner in which the screw socket of this invention having the construction described above is put to use. Temporary attachment of the screw socket to a metal panel X is accomplished by a procedure comprising the steps of poising the leg 2 of the socket over a substantially rectangular perforation "x" bored in advance in the metal panel X, pushing the leg 2 down the perforation "x" by causing the leg to shrink by virtue of the slits 5 and, after the flange has collided into the panel, allowing the leg 2 to resume its original shape by virtue of the elasticity of the plastic material and thereby allowing the steps 6, 6 formed on the periphery of the leg 2 to come into hooked engagement with the edge of the aforementioned perforation "x", with the lower surface of the flange 1 kept in intimate contact with the upper surface of the panel X. Fast attachment of another panel or some other part Y to the aforementioned metal panel X is then attained by placing the panel or part Y on the upper surface of the flange 1, setting a screw 4 in a perforation bored in advance in the part Y (see FIG. 2) and helically inserting the screw into the through hole 3 past the perforations "x" and "y". In this case, the leg 2 which has been inserted through the perforation "x" in the panel X has its forward end diverged by the insertion of the screw 4 and causes the jogs 7, 7 to be pushed out and the steps 6, 6 to be brought into tight engagement with the edge of the perforation "x", with the result that the screw socket itself is fixed firmly in position and the screw is retained safely inside the through hole 3. In the screw socket of the present invention, the slits 5, 5 which divide the leg 2 are formed in such a way that the lateral directions thereof do not coincide with any of the radii drawn from the central line "a" of the through hole 3. If the screw happens to be inserted with a slant into the through hole, therefore, there is no possibility that it will advance in the slanted course and thrust through either of the slits similarly to the conventional screw socket. Instead, the screw on colliding into the inner wall of the through hole is pushed back to take its correct course on the axis, with the result that it will be received and held correctly inside the through hole.

Since the slits in the screw socket of the present invention are formed so that the lateral directions of the slits do not coincide with any of the radii drawn from the central line of the through hole 3 and since the screw socket, therefore, precludes any slantingly inserted screw from keeping its slanted course and forces the screw to take a corrected course on the axis, it does not happen that tips of such screws accidentally thrust out of the periphery of the legs of sockets even in case where a multiplicity of screws are driven into screw sockets of this invention one after another in rapid succession by use of an air driver, for example. When the screw sockets of this invention are used for the purpose of attaching parts inside electrical appliances or automobile engine rooms, therefore, the uncomfortable possibility of tips of screw thrusting out and consequently breaking coats of electric cables and inflicting other similar damage can be avoided. Also in terms of work, the screw socket of this invention permits the screw to be fixed in position rapidly and accurately.

In the preferred embodiment cited above, the slits 5, 5 are disposed symmetrically with reference to the central line of the through hole 3. The disposition of these two slits is not limited to such symmetrical relationship. The effect of this invention can be obtained, for example, by having the two slits disposed in such a way that the lateral directions of the slits fall in one straight line running parallelly to one pair of diametrically opposed radii drawn from the aforementioned central line of the through hole, namely that one of the slits 5 illustrated in the drawing is translated across the aforementioned pair of diametrically opposed radii to a line completely falling in an extension of the line including the other slit. When the slits are formed in such a way, the segments 2a, 2a into which the leg is divided by the slits are no longer symmetrical and they are unevenly diverged by the helical insertion of the screw. Notwithstanding the absence of symmetry in the disposition of the slits, the screw socket can be expected to provide substantially the same effect as that attained by the screw socket of the aforementioned preferred embodiment of this invention.

What is claimed is:

1. A plastic screw socket integrally comprising a flange designed to be brought into contact with one surface of a given panel and a leg extending perpendicularly from the lower surface of the flange and adapted to be inserted through a matched perforation provided in advance in the panel, said flange and said leg being provided with a through hole pierced vertically therethrough from the upper surface of the flange to the lower end of the leg, said leg being divided into two opposed segments by two substantially planar, parallel slits provided longitudinally therein on opposite sides of the center line of the through hole from the lower end of the leg upwardly to the vicinity of the flange, whereby insertion of a complementary screw having a diameter greater than the diameter of the through hole from above the flange into the through hole causes each of the legs to bulge outwardly and transversely relative to each other and consequently causing them to come into tight engagment with all of the inner walls of the perforation in the panel, said two slits forming said two opposed segments so arranged that they do not coincide with any of the radii drawn from the center line of the through hole.

2. The plastic screw socket according to claim 1 wherein the two slits for dividing the leg into the two segments are inserted in such a way that they are disposed symmetrically with reference to one pair of diametrically opposed radii extending from the center of the through hole.

* * * * *